(12) United States Patent
Wilson

(10) Patent No.: US 6,556,394 B1
(45) Date of Patent: *Apr. 29, 2003

(54) INTEGRITY MONITOR FOR NEUTRAL-TO-GROUND SUPPRESSION CIRCUIT

(75) Inventor: Glenn E. Wilson, Endicott, NY (US)

(73) Assignee: Emerson Electric Co., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/366,928

(22) Filed: Aug. 4, 1999

(51) Int. Cl.$^7$ .................................................. H02H 3/16
(52) U.S. Cl. ......................................... 361/42; 340/652
(58) Field of Search ........................... 361/56, 42, 124, 361/104, 127, 111, 118, 103, 117, 88, 91.4, 91.6; 340/638, 650, 652; 324/550, 556

(56) References Cited

U.S. PATENT DOCUMENTS

| | | | |
|---|---|---|---|
| 4,739,436 A | * | 4/1988 | Stefani et al. ................ 361/56 |
| 5,032,946 A | * | 7/1991 | Misencik et al. ............. 361/56 |
| 5,432,667 A | * | 7/1995 | Rau et al. .................... 361/124 |
| 5,617,284 A | * | 4/1997 | Paradise ...................... 361/111 |
| 6,118,256 A | * | 9/2000 | Wilson ......................... 320/166 |

* cited by examiner

Primary Examiner—Kim Huynh
(74) Attorney, Agent, or Firm—Howrey Simon Arnold & White, LLP

(57) ABSTRACT

This invention relates generally to surge suppression and more particularly, to monitoring the integrity of a neutral-to-ground suppression circuit or other suppression circuit. In accordance with the present invention, a neutral-to-ground fault monitor is disclosed, eliminating one or more disadvantages associated with the prior art. One embodiment of the fault monitor includes a suppression circuit and a monitoring circuit where the suppression circuit includes a first terminal, a second terminal, a surge suppressor, and a current fuse, wherein the surge suppressor and the current fuse are operatively connected between the first terminal and the second terminal and where the monitoring circuit indicates a fault upon sensing a loss of functionality of the surge suppressor or the current fuse. Regardless of the cause of failure (e.g., transient or continuous, or positive or negative overvoltage or excessive current) or the type of system (e.g., DC, single or multi-phase AC), the disclosed invention reliably indicates a neutral-to-ground fault caused by any one monitored component. Whether the failure sensed is a surge suppressor or a current fuse, the monitoring circuit provides one or more alternative current paths to sense particular failures and further provides a failure indication for each detected failure. A light emitting diode (LED) circuit enabled by the monitoring circuit provides a reliable visual indication of a functional and a failed surge suppression circuit.

26 Claims, 1 Drawing Sheet

US 6,556,394 B1

INTEGRITY MONITOR FOR NEUTRAL-TO-GROUND SUPPRESSION CIRCUIT

BACKGROUND OF THE INVENTION

1. Field of the Invention

This invention relates generally to surge suppression and more particularly, to monitoring the integrity of a neutral-to-ground suppression circuit.

2. Description of the Related Art

Surge suppressors are employed to prevent overvoltage conditions, typically by shunting excessive voltage transients caused by sources including lightning, inductive switching, electrostatic discharge, and unbalanced wye configurations. Surge suppressor devices often utilize Metal Oxide Varistors (MOV)s, Silicon Avalanche Diodes (SAD)s, selenium arrays, switched capacitors, switched resistors, or active components (e.g., Field Effect Transistor (FET), Bipolar Junction Transistor (BJT), Metal Oxide Silicon Controlled Thyristor (MCT), Insulated Gate Bipolar Transistor (IGBT)).

Surge suppressors generally must be as transparent as possible to system operation until needed to absorb excess energy. Thus, under normal system operation, surge suppressors exhibit an open, or high impedance state. Upon detection of intolerably high voltage (i.e. the clamping voltage of a surge suppressor), surge suppressors exhibit a low impedance state. Increased current is drawn into the surge suppressor due to its decreased impedance. The excessive energy shunted away from the load is received and partly or wholly absorbed by the surge suppressor. However, surge suppressors fail when they shunt too much energy. Therefore, surge suppressors are limited in the amount of energy which they may receive short of failure.

An MOV typically fails as a short circuit, causing a steep rise in current magnitude and ultimately an explosion unless the current path through the MOV is broken. Most often, a properly sized current fuse in series with an MOV breaks the current path through the MOV prior to explosion. In fact, the series fuse is usually sized to clear (i.e. blow) at a magnitude less than the MOV's maximum current rating, sometimes preventing MOV failure in addition to preventing explosion.

Given the complexity of modern systems employing surge suppressors among many other components, it is desirable to obtain a clear indication when one component of the system fails. For instance, when an MOV in series with a current fuse is deployed to provide phase-to-neutral, phase-to-ground, or phase-to-phase protection, the phase voltage between the fuse link and the MOV will indicate a reduced voltage magnitude if the MOV fails and the fuse clears. Quite often, a visual indication is used to isolate this and other system failures. However, when an MOV and current fuse are deployed between ground and neutral, there is no phase voltage to monitor as an indication of surge suppressor failure. Instead, a neutral-to-ground fault circuit must sense and report surge suppressor failures.

One such circuit is disclosed in U.S. Pat. No. 5,432,667, "Neutral-to-Ground Fault Sensing Circuit." Therein, inventors Rau and Bulson disclose a relatively complex and expensive circuit which deploys an MOV and two current fuses in series between neutral and ground wherein surge suppressor integrity is monitored at the center of the two fuses. The fuses are packed in sand within a dual fuse container. The theory of operation is that the fuses will clear when the MOV fails short. The theory intimates that both fuses will clear when one clears. However, there is no guarantee that both fuses will clear together, especially during a relatively low energy surge dampened by the thermal isolation provided by the sand. Further, the MOV failure will not be detected until and unless both fuses clear. Therefore, there is a need for an inexpensive and reliable indication of neutral-to-ground surge suppression failure.

SUMMARY OF THE INVENTION

This invention relates generally to surge suppression and more particularly, to monitoring the integrity of a neutral-to-ground suppression circuit. In accordance with the present invention, a neutral-to-ground fault monitoring circuit is disclosed, eliminating one or more disadvantages associated with the prior art. Regardless of the cause of failure (e.g., transient or continuous, or positive or negative overvoltage or excessive current) or the type of system (e.g., DC, single or at multi-phase AC), the disclosed invention indicates a neutral-to-ground fault caused by any one monitored component without requiring subsequent clearing of fuses or other device failures.

One embodiment of the fault monitor includes a suppression circuit and a monitoring circuit where the suppression circuit includes a first terminal, a second terminal, a surge suppressor, and a current fuse, wherein the surge suppressor and the current fuse are operatively connected between the first terminal and the second terminal and where the monitoring circuit indicates a fault upon sensing a loss of functionality of the surge suppressor or the current fuse.

Another embodiment of the fault monitor includes a suppression circuit and a monitoring circuit where the suppression circuit includes a first terminal, a second terminal, a first surge suppressor, and a second surge suppressor, wherein the first surge suppressor and the second surge suppressor are operatively connected between the first terminal and the second terminal and where the monitoring circuit indicates a fault upon sensing a loss of functionality of the first surge suppressor or the second surge suppressor.

BRIEF DESCRIPTION OF THE DRAWINGS

Other objects and advantages of the invention will become apparent upon reading the following detailed description and upon reference to the drawings in which.

Figure 1:
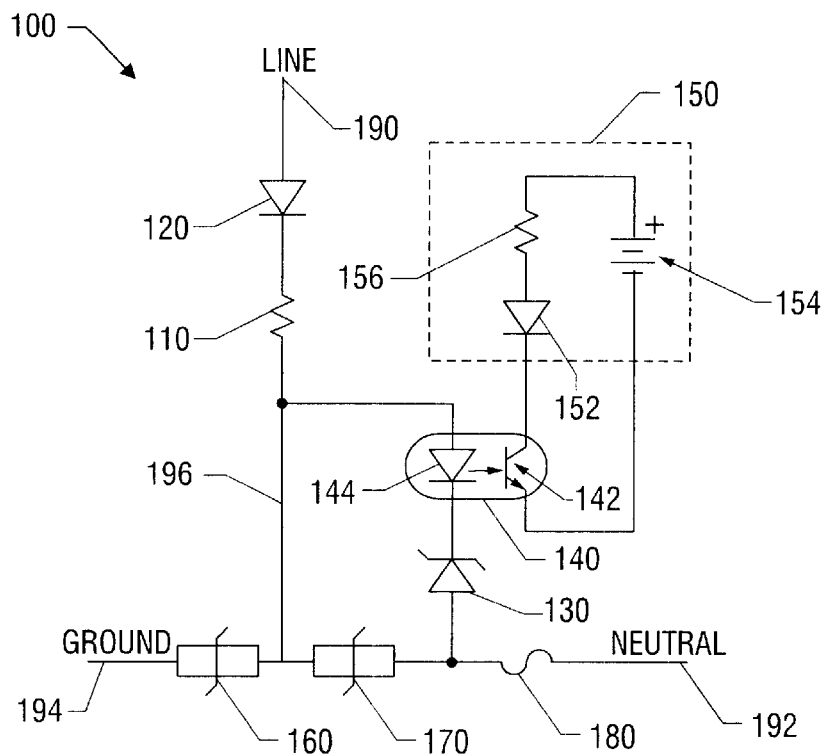
FIG. 1 illustrates the physical connectivity of one embodiment of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. For instance, an indication of a fault could be made visual, audible, supplied as a signal within the same or another circuit, or could be used to drive one or more devices or circuits. Furthermore, the invention is applicable to any DC or AC terminals, not simply AC neutral-to-ground terminals.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such, as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 illustrates one particular embodiment of the invention. Therein, a fault monitor 100 is disclosed, including resistor 110, diode 120, zener diode 130, and optocoupler 140. For completeness, light emitting diode (LED) circuit 150 is shown as a fault indicator. The monitoring circuit monitors the integrity of the suppression circuit, consisting of surge suppressor 160 (e.g., MOV), surge suppressor 170, and current fuse 180. Surge suppressor 160 and surge suppressor 170 typically consist of MOV devices, but in fact may be any surge suppressor. The configuration of the monitoring circuit and the surge suppressor circuit assumes that the current fuse 180 is sized to clear before either surge suppressor 160 or 170 open (e.g., explode). Although the monitoring circuit will provide a clear indication of failure either way, it is a better design practice to size fuse 180 to clear before either surge suppressor 160 or 170 fails open.

The functionality of the circuit shown in FIG. 1 is best understood by discussing four phases of operation: normal operation, open fuse 180, shorted surge suppressor 160, and shorted surge suppressor 170. During normal operation (e.g., fully functional voltage suppression) the monitoring circuit directs current from the source line 190 through diode 120, resistor 110, the optocoupler LED 152, zener diode 130, current fuse 180, and into the neutral line 192. As long as sufficient current flows through optocoupler photodiode 144, optocoupler phototransistor 142 will hold LED 152 "on" by drawing current from source 154 through current limiting resistor 156 and LED 152. Source 154 may be any source, including a rectified input line source 190. Additionally, the LED circuit 150 is a simple representation of any visual indicator circuit. Optocoupler 140 serves as an integrity indicator while LED circuit 150 in serves as a status indicator; in this case a visual representation of integrity.

When fuse 180 clears (e.g. opens), there is no current path through the optocoupler 140, causing phototransistor 142 and LED 152 to turn "off" as an indication of a neutral-to-ground fault. Although monitoring circuit 100 would yield the same result in either case, the better design practice is to size fuse 180 to clear when surge suppressor 160 and surge suppressor 170 remain operable rather than after they fail. Of course it may take less than complete loss of functionality of current fuse 180 to essentially eliminate the path through optocoupler 140. Such a scenario is well within the scope of this invention.

When surge suppressor 160 fails (e.g. shorts), all current flowing through resistor 110 is drawn away from optocoupler 140 into GROUND terminal 194, causing phototransistor 142 and LED 152 to turn "off" as an indication of a neutral-to-ground fault. In this phase of operation, zener diode 130 serves the purpose of preventing current from flowing through optocoupler 140 when the ground terminal 194 and neutral terminal 192 are not at equal potential, including AC is variation. If the potentials are different when surge suppressor 160 shorts, in order for current to flow through optocoupler 140 during normal operation the potential variance must be great enough to overcome the voltage of zener diode 130. The value of zener diode 130 could be on the order of 12 Volts for reasonable operation, but must be less than the peak voltage of input source 190 in order to allow current to flow through optocoupler 140.

When surge suppressor 170 fails short, optocoupler 140 is short circuited, causing all current flowing through resistor 110 to flow into bypass current path 196 and forcing phototransistor 142 and LED 152 to turn "off" as an indication of a neutral-to-ground fault. In the unlikely event that current fuse 180 remains intact after surge suppressor 170 shorts, current flowing through the short circuit consisting of bypass current path 196 and surge suppressor 170 would flow into NEUTRAL terminal 192. However, the potential developed at bypass current path 196 would be insufficient to forward bias photodiode 144 of optocoupler 140.

Of course it may take less than complete loss of functionality of either surge suppressor 160 or surge suppressor 170 to disrupt the path through optocoupler 140. Further, surge suppressor 160 is unnecessary if an available path to GROUND otherwise does not exist. Further still, one skilled in the art having the benefit of this disclosure will see that the monitoring circuit detects faults in either surge suppressor 160 or surge suppressor 170 regardless of the presence of current fuse 180. Such scenarios are well within the scope of this invention.

A more complex monitoring circuit could be employed to monitor the integrity of each surge suppressor, however, the embodiment illustrated in FIG. 1 simplistically and cost efficiently provides a reliable failure indication when either surge suppressor 160, surge suppressor 170, or fuse 180 fails.

Figure 2:
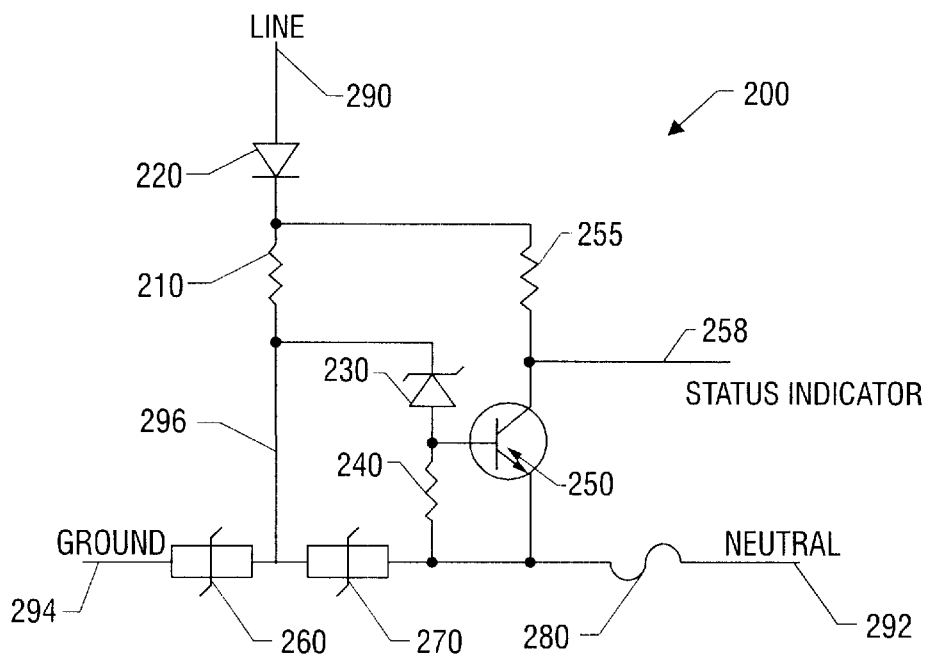
FIG. 2 illustrates the physical connectivity of another embodiment of the invention.

An alternative embodiment is shown in FIG. 2. FIG. 2 presents one embodiment of a fault monitor without isolation 200. The operation of fault monitor 200 is most easily understood by discussing four distinct modes of operation: normal operation and three failure modes, open fuse 280, shorted surge suppressor 260, and shorted surge suppressor 270. The suppression circuit includes GROUND 194, surge suppressor 160, surge suppressor 170, current fuse 180, and NEUTRAL 192. The monitoring circuit includes diode 220, resistor 210, bypass current path 296, zener diode 230, resistor 240, resistor 255, and transistor 250.

During normal operation, e.g., without failure of surge suppressor 260, surge suppressor 270, or fuse 280, current is directed from source line 290 through diode 220, resistor 210, zener diode 230, and resistor 240 until integrity indicator, e.g., transistor, 250 is sufficiently biased by the voltage across resistor 240. Thereafter, transistor 250 turns from "off" to "on," conducting current through diode 220 and resistor 255. Status indicator 258 reports the status of transistor 250. When transistor 250 is "on," status indicator 258 reports neutral-to-ground protection "pass"; otherwise, status indicator 258 reports "fail" to indicate a failure mode of operation. Transistor 250 serves as the integrity indicator while status indicator 258 serves as a signal representation of integrity.

In each of the three failure modes of operation, transistor 250 is "off" because the current path through transistor 250 is open. When surge suppressor 260 fails short, the current path through zener diode 230 and resistor 240 is short-circuited by bypass current path 296. Current is drawn from source line 290 through rectifying diode 220, resistor 210, bypass current path 296, failed surge suppressor 260, and into ground 294. When this path of least resistance is made available by the failure of surge suppressor 260, transistor 250 loses its voltage bias across resistor 240 and shuts "off," i.e., stops drawing current from source line 290 through resistor 255. Status indicator 258 reports this "off" status of transistor 250 as neutral-to-ground protection "fail."

Referring to FIG. 2, when surge suppressor 270 fails short, the current path through zener diode 230 and resistor 240 is also short-circuited by bypass current path 296. Current is directed from source line 290 through diode 220, resistor 210, bypass current path 296, failed surge suppressor 270, fuse 280, and into neutral 292. When this path of least resistance is made available by the failure of surge suppressor 260, transistor 250 loses its voltage bias across resistor 240 and shuts "off." Status indicator 258 reports this "off" status of transistor 250 as neutral-to-ground protection "fail."

Referring again to FIG. 2, when fuse 280 fails open, the current path to ground 294 and neutral 292 through transistor 250 is foreclosed. Status indicator 258 reports the "off" status of transistor 250 as neutral-to-ground protection "fail." Operation of the integrity monitor circuit when a combination of surge suppressor 260, surge suppressor 270, and fuse 280 fails similarly forecloses the current path through transistor 250, resulting in a neutral-to-ground protection "fail" report from status indicator 258.

As with the circuit described in FIG. 1, it may take less than complete loss of functionality of either surge suppressor 260, surge suppressor 270, or current fuse 280 to disrupt the current path through an integrity indicator such as transistor 250. Further, surge suppressor 260 is unnecessary if an available path to GROUND otherwise does not exist. Further still, one skilled in the art having the benefit of this disclosure will see that the monitoring circuit detects faults in either surge suppressor 260 or surge suppressor 270 regardless of the presence of current fuse 280. Such scenarios are well within the scope of this invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiment disclosed above may be altered or modified and all such variations are considered within the scope and spirit of the invention. Accordingly, the protection sought herein is as set forth in the claims below.

What is claimed:

1. A fault monitor comprising:
   (a) a suppression circuit including a first terminal, a second terminal, a surge suppressor and a current fuse, wherein the surge suppressor and the current fuse are operatively connected between the first terminal and the second terminal; and
   (b) a monitoring circuit having an integrity indicator capable of indicating a fault upon a loss of functionality of the surge suppressor before it fails open or a loss of functionality of the current fuse
   wherein the monitoring circuit includes a current path through the integrity indicator which is capable of being disrupted upon any loss of functionality and wherein the integrity indicator includes a transistor and disruption of the current path includes loss of transistor bias.

2. A fault monitor comprising:
   (a) a suppression circuit including a first terminal, a second terminal, a surge suppressor and a current fuse, wherein the surge suppressor and the current fuse are operatively connected between the first terminal and the second terminal; and
   (b) a monitoring circuit having an integrity indicator capable of indicating a fault upon a loss of functionality of the surge suppressor before it fails open or a loss of functionality of the current fuse
   wherein the surge suppressor and current fuse are connected in series between the first terminal and the second terminal and wherein the monitoring circuit includes a bypass current path originating at a current source and a second current path through the integrity indicator originating at the current source and terminating at the connection between the surge suppressor and the current fuse.

3. The fault monitor of claim 2 wherein the current source consists of one phase in a multi-phase system.

4. The fault monitor of claim 2 wherein the first terminal is ground and the second terminal is power in a direct current system.

5. The fault monitor of claim 1 or claim 2, wherein the surge suppressor includes a Metal Oxide Varistor ("MOV").

6. The fault monitor of claim 1 or claim 2, wherein the integrity indicator enables an illumination source.

7. The fault monitor of claim 1 or claim 2, wherein the integrity indicator enables an audible source.

8. The fault monitor of claim 1 or claim 2, wherein the integrity indicator enables a device or circuit based upon the integrity of the surge suppressor or the current fuse.

9. A fault monitor comprising:
   (a) a suppression circuit including a first terminal, a second terminal, a first surge suppressor and a second surge suppressor, wherein the first surge suppressor and the second surge suppressor are operatively connected between the first terminal and the second terminal; and
   (b) a monitoring circuit having an integrity indicator capable of indicating a fault upon a loss of functionality of the first surge suppressor before it fails open or the second surge suppressor before it fails open
   wherein the monitoring circuit includes a current path through the integrity indicator which is capable of being disrupted upon any loss of functionality and wherein the integrity indicator includes a transistor and disruption of the current path includes loss of transistor bias.

10. A fault monitor comprising:
    (a) a suppression circuit including a first terminal, a second terminal, a first surge suppressor and a second surge suppressor, wherein the first surge suppressor and the second surge suppressor are operatively connected between the first terminal and the second terminal; and
    (b) a monitoring circuit having an integrity indicator capable of indicating a fault upon a loss of functionality of the first surge suppressor before it fails open or the second surge suppressor before it fails open
    wherein the first surge suppressor and the second surge suppressor are connected in series between the first terminal and the second terminal and wherein the monitoring circuit includes a bypass current path originating at a current source and a second current path through the integrity indicator originating at the current source and coupled to the first terminal.

11. The fault monitor of claim 10, wherein the current source consists of one phase in a multi-phase alternating current system.

12. The fault monitor of claim 10, wherein the first terminal is ground and the second terminal is power in a direct current system.

13. The fault monitor of claim 9 or 10, wherein any surge suppressor includes a Metal Oxide Varistor ("MOV").

14. The fault monitor of claim 9 or 10, wherein the integrity indicator drives an illumination source.

15. The fault monitor of claim 9 or 10, wherein the integrity indicator drives an audible source.

16. The fault monitor of claim 9 or 10, wherein the integrity indicator drives one or more devices based upon the integrity of the first surge suppressor or the second surge suppressor.

17. A fault monitor comprising:
   (a) a suppression circuit including a first terminal, a second terminal, a first surge suppressor, second surge suppressor and a current fuse, wherein the first surge suppressor, second surge suppressor and the current fuse are operatively connected between the first terminal and the second terminal; and
   (b) a monitoring circuit having an integrity indicator capable of indicating a fault upon loss of functionality of the first surge suppressor before it fails open, loss of functionality of the second surge suppressor before it fails open or loss of functionality of the current fuse
   wherein the monitoring circuit includes a current path through the integrity indicator which is capable of being disrupted upon any loss of functionality and wherein the integrity indicator includes a transistor and disruption of the current path includes loss of transistor bias.

18. A fault monitor comprising:
   (a) a suppression circuit including a first terminal, a second terminal, a first surge suppressor, second surge suppressor and a current fuse, wherein the first surge suppressor, second surge suppressor and the current fuse are operatively connected between the first terminal and the second terminal; and
   (b) a monitoring circuit having an integrity indicator capable of indicating a fault upon loss of functionality of the first surge suppressor before it fails open, loss of functionality of the second surge suppressor before it fails open or loss of functionality of the current fuse
   wherein the first surge suppressor, second surge suppressor and the current fuse are connected in series between the first terminal and the second terminal.

19. The fault monitor of claim 18, wherein the second surge suppressor is connected between the first surge suppressor and the current fuse.

20. The fault monitor of claim 18, wherein the first terminal is neutral and the second terminal is ground in an alternating current system.

21. The fault monitor of claim 19, wherein the current source consists of one phase in a multi-phase alternating current system.

22. The fault monitor of claim 19, wherein the first terminal is ground and the second terminal is power in a direct current system.

23. The fault monitor of claim 19, wherein any surge suppressor includes a Metal Oxide Varistor ("MOV").

24. The fault monitor of claim 19, wherein the integrity indicator drives an illumination source.

25. The fault monitor of claim 19, wherein the integrity indicator drives an audible source.

26. The fault monitor of claim 19, wherein the integrity indicator drives one or more devices based upon any loss of functionality.

* * * * *